US011218611B2

United States Patent
Arimori et al.

(10) Patent No.: US 11,218,611 B2
(45) Date of Patent: Jan. 4, 2022

(54) IMAGE READING APPARATUS AND CONTROL METHOD THEREOF

(71) Applicant: SEIKO EPSON CORPORATION, Tokyo (JP)

(72) Inventors: Kazuhiko Arimori, Kitakyushu (JP); Masahiko Mizoguchi, Kitakyushu (JP); Tomokazu Shimizu, Kitakyushu (JP); Wataru Beppu, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/886,216

(22) Filed: May 28, 2020

(65) Prior Publication Data

US 2020/0382669 A1 Dec. 3, 2020

(30) Foreign Application Priority Data

May 29, 2019 (JP) .............................. JP2019-100614

(51) Int. Cl.
*H04N 1/00* (2006.01)
*B65H 43/08* (2006.01)

(52) U.S. Cl.
CPC ......... *H04N 1/00652* (2013.01); *B65H 43/08* (2013.01); *H04N 1/00657* (2013.01); *B65H 2511/11* (2013.01); *B65H 2511/12* (2013.01); *H04N 2201/04737* (2013.01)

(58) Field of Classification Search
None
See application file for complete search history.

(56) References Cited

U.S. PATENT DOCUMENTS

| 4,044,385 | A | * | 8/1977 | Nishimura | ............... | G03F 7/202 |
| | | | | | | 358/300 |
| 4,264,186 | A | * | 4/1981 | Fujiwara | ............... | G03G 15/307 |
| | | | | | | 399/160 |
| 4,711,558 | A | * | 12/1987 | Tanioka | ............... | G03G 15/041 |
| | | | | | | 355/55 |
| 4,939,554 | A | * | 7/1990 | Hirabayashi | ........... | G03G 15/50 |
| | | | | | | 271/265.01 |
| 4,956,679 | A | * | 9/1990 | Takano | .................. | G03G 15/01 |
| | | | | | | 399/184 |

(Continued)

FOREIGN PATENT DOCUMENTS

JP 2011-246244 12/2011

*Primary Examiner* — Anh-Vinh Thi Nguyen
(74) *Attorney, Agent, or Firm* — Workman Nydegger

(57) ABSTRACT

An image reading apparatus includes a reading unit, a transport unit that transport a document, a feeding unit that transports the document to the transport unit, a controller that stops the feeding operation of the feeding unit after the leading end of the preceding document transported from the feeding unit reaches the transport unit and restarts the feeding operation after the rear end of the preceding document passes a predetermined position. The controller, restarts the feeding operation a first time after the rear end of the succeeding document following the preceding document passes the predetermined position when a size of the preceding document indicates a first size, and restarts the feeding operation a second time after the rear end of the succeeding document passes the predetermined position where the second time is longer than the first time when the size indicates a second size larger than the first size.

6 Claims, 12 Drawing Sheets

(56) References Cited

U.S. PATENT DOCUMENTS

| | | | | |
|---|---|---|---|---|
| 5,008,712 | A * | 4/1991 | Inuzuka | G03G 15/041 399/32 |
| 5,014,123 | A * | 5/1991 | Imoto | H04N 1/00267 358/506 |
| 5,197,723 | A * | 3/1993 | Yamada | G03G 15/60 271/3.15 |
| 6,339,685 | B1 * | 1/2002 | Okamoto | B65H 7/00 270/58.01 |
| 6,351,625 | B1 * | 2/2002 | Sato | G03G 15/655 399/382 |
| 2005/0100361 | A1 * | 5/2005 | Tanaka | G03G 15/751 399/101 |
| 2005/0122544 | A1 * | 6/2005 | Mizuhashi | H04N 1/00822 358/1.18 |
| 2005/0285327 | A1 * | 12/2005 | Suzuki | H04N 1/00602 271/109 |
| 2008/0292334 | A1 * | 11/2008 | Takahashi | B65H 7/04 399/38 |
| 2009/0057984 | A1 * | 3/2009 | Matsumoto | B65H 7/18 271/10.03 |
| 2010/0158592 | A1 * | 6/2010 | Odagiri | H04N 1/00657 399/365 |
| 2015/0277334 | A1 * | 10/2015 | Matsuo | G03G 15/5012 399/21 |
| 2019/0256309 | A1 * | 8/2019 | Shiota | H04N 1/00761 |
| 2020/0255252 | A1 * | 8/2020 | Seki | B65H 29/14 |

* cited by examiner

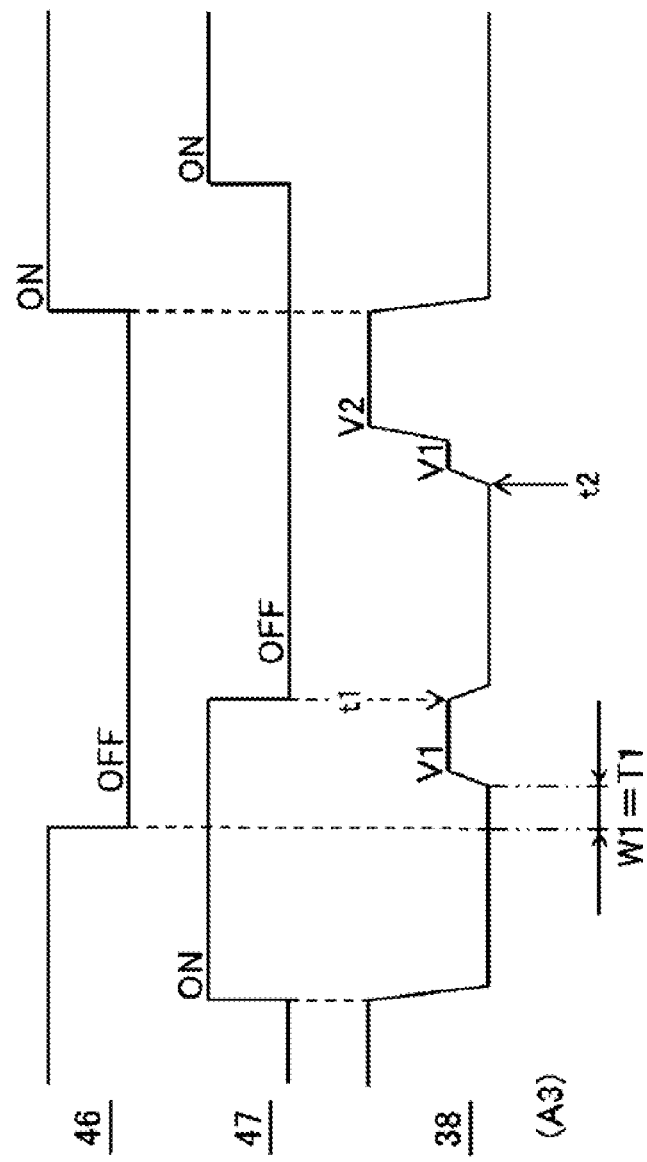

IMAGE READING APPARATUS AND CONTROL METHOD THEREOF

The present application is based on, and claims priority from JP Application Serial Number 2019-100614, filed May 29, 2019, the disclosure of which is hereby incorporated by reference herein in its entirety.

BACKGROUND

1. Technical Field

The present disclosure relates to an image reading apparatus that reads a document separated from a document group, and a control method thereof.

2. Related Art

An image reading apparatus, for example, separates documents one by one from a document group set on a paper feed tray, transports respective documents to a reading unit through the feeding unit, and reads the respective documents by the reading unit to generate image data in a buffer to perform an image process for converting the image data in the buffer into an output format. While it is necessary to increase the feeding speed of respective documents by the feeding unit in order to increase the throughput of the image reading process, the feeding operation of the feeding unit between documents is temporarily stopped in order to secure time for an image process. As a reference, the image reading apparatus disclosed in JP-A-2011-246244 includes a single drive motor for a drive system for transporting a document, and reads the succeeding document by inverting the succeeding document by the inverting means when the interval between the preceding document and the succeeding document is smaller than the predetermined document interval.

For example, when the period during which the feeding operation of the feeding unit is temporarily stopped is set to the A4 size document, the throughput of the process for reading the A4 size document is improved. However, when reading an A3 size document, the above period may not be enough to perform the image process, and in some cases, the feeding operation restarted to feed the succeeding document to the reading unit must be temporarily stopped. When the restarted feeding operation is temporarily stopped, it takes time to return to the original feeding operation, so that the throughput of the image reading process is greatly reduced. Even when the feeding operation of the feeding unit is slowed down instead of temporarily stopped, it takes time to return to the original high-speed feeding operation, so that the throughput of the image reading process is greatly reduced. In the image reading apparatus disclosed in JP-A-2011-246244, a single drive motor is used for a drive system for transporting a document, so that it is not possible to stop or slow down only the feeding operation of the feeding unit while the document is being transported.

SUMMARY

According to an aspect of the present disclosure, an image reading apparatus includes a reading unit that generates image data by reading a document, a storage unit that stores the image data, a transport unit that transports the document along a transport path that passes the reading unit, a feeding unit that transports the document separated from a document group to the transport unit along the transport path, a controller that stops a feeding operation of the feeding unit after a leading end of a preceding document transported from the feeding unit reaches the transport unit, and restart the feeding operation after a rear end of the preceding document passes a predetermined position, and an acquisition unit that acquires size information indicating a size of the preceding document, wherein the controller restarts the feeding operation a first time after a rear end of a succeeding document following the preceding document passes the predetermined position when the size information indicates a first size, and restarts the feeding operation a second time after the rear end of the succeeding document passes the predetermined position, where the second time is longer than the first time, when the size information indicates a second size larger than the first size.

According to another aspect of the present disclosure, an image reading apparatus includes a reading unit that generates image data by reading a document, a storage unit that stores the image data, a transport unit that transports the document along a transport path that passes the reading unit, a feeding unit that transports the document separated from a document group to the transport unit along the transport path, a controller that sets, at a first speed or less, a feeding operation of the feeding unit after a leading end of a preceding document transported from the feeding unit reaches the transport unit, and sets, at a second speed, the feeding operation after a rear end of the preceding document passes a predetermined position, the second speed being higher than the first speed, and an acquisition unit that acquires size information indicating a size of the preceding document, wherein the controller sets, at the second speed, the feeding operation a first time after a rear end of a succeeding document following the preceding document passes the predetermined position when the size information indicates a first size, and sets, at the second speed, the feeding operation a second time after the rear end of the succeeding document passes the predetermined position, where the second time is longer than the first time, when the size information indicates a second size larger than the first size.

According to still another aspect of the present disclosure, in a method of controlling an image reading apparatus, where the image reading apparatus includes a reading unit that generates image data by reading a document, a storage unit that stores the image data, a transport unit that transports the document along a transport path that passes the reading unit, and a feeding unit that transports the document separated from a document group to the transport unit along the transport path, the method includes a first step of stopping a feeding operation of the feeding unit after a leading end of a preceding document transported from the feeding unit reaches the transport unit, and restarting the feeding operation after a rear end of the preceding document passes a predetermined position, and a second step of acquiring size information indicating a size of the preceding document, wherein the first step includes restarting the feeding operation a first time after a rear end of a succeeding document following the preceding document passes the predetermined position when the size information indicates a first size, and restarting the feeding operation a second time after the rear end of the succeeding document passes the predetermined position, the second time being longer than the first time, when the size information indicates a second size larger than the first size.

BRIEF DESCRIPTION OF THE DRAWINGS

FIG. 12 is a diagram schematically illustrating an example of a timing chart when there is a command to temporarily stop a paper feed motor.

DESCRIPTION OF EXEMPLARY EMBODIMENTS

Figure 1:
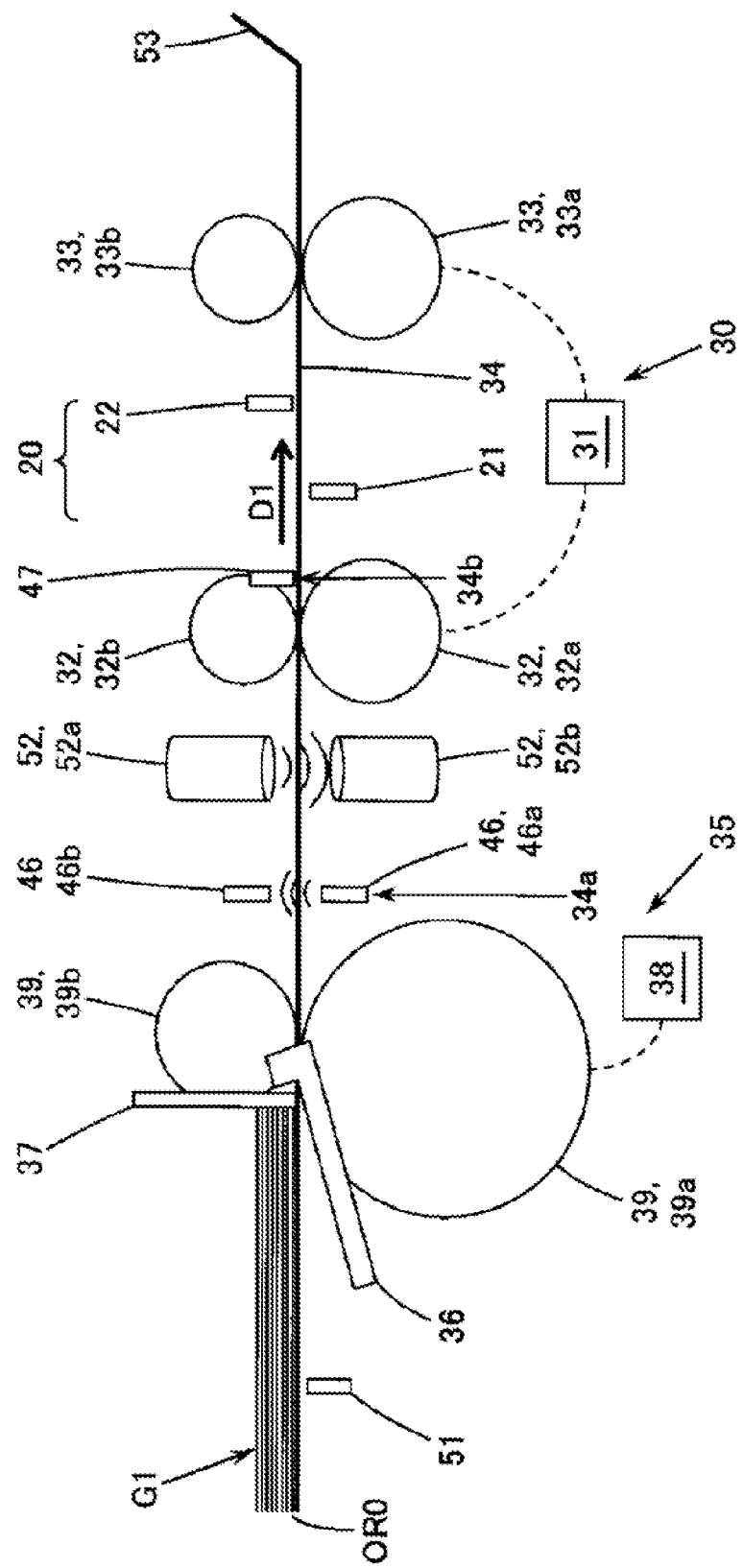
FIG. 1 is a diagram schematically illustrating a configuration example of an image reading apparatus.

Hereinafter, embodiments of the present disclosure will be described. Of course, the following embodiments are merely examples of the present disclosure, and not all of the features described in the embodiments are essential for solving the disclosure.

1. OUTLINE OF TECHNOLOGY INCLUDED IN THE PRESENT DISCLOSURE

First, the outline of the technology included in the present disclosure will be described with reference to the examples illustrated in FIGS. 1 to 12. It should be noted that the drawings of the present application are schematic diagrams illustrating examples, and the enlargement ratios in the respective directions illustrated in these drawings may be different, and the respective drawings may not match. Of course, respective components of the present technology are not limited to a specific example indicated by a reference numeral. In the "Outline of technology included in the present disclosure", the contents in parentheses mean supplementary explanation of the immediately preceding word.

First Embodiment

Figure 2:
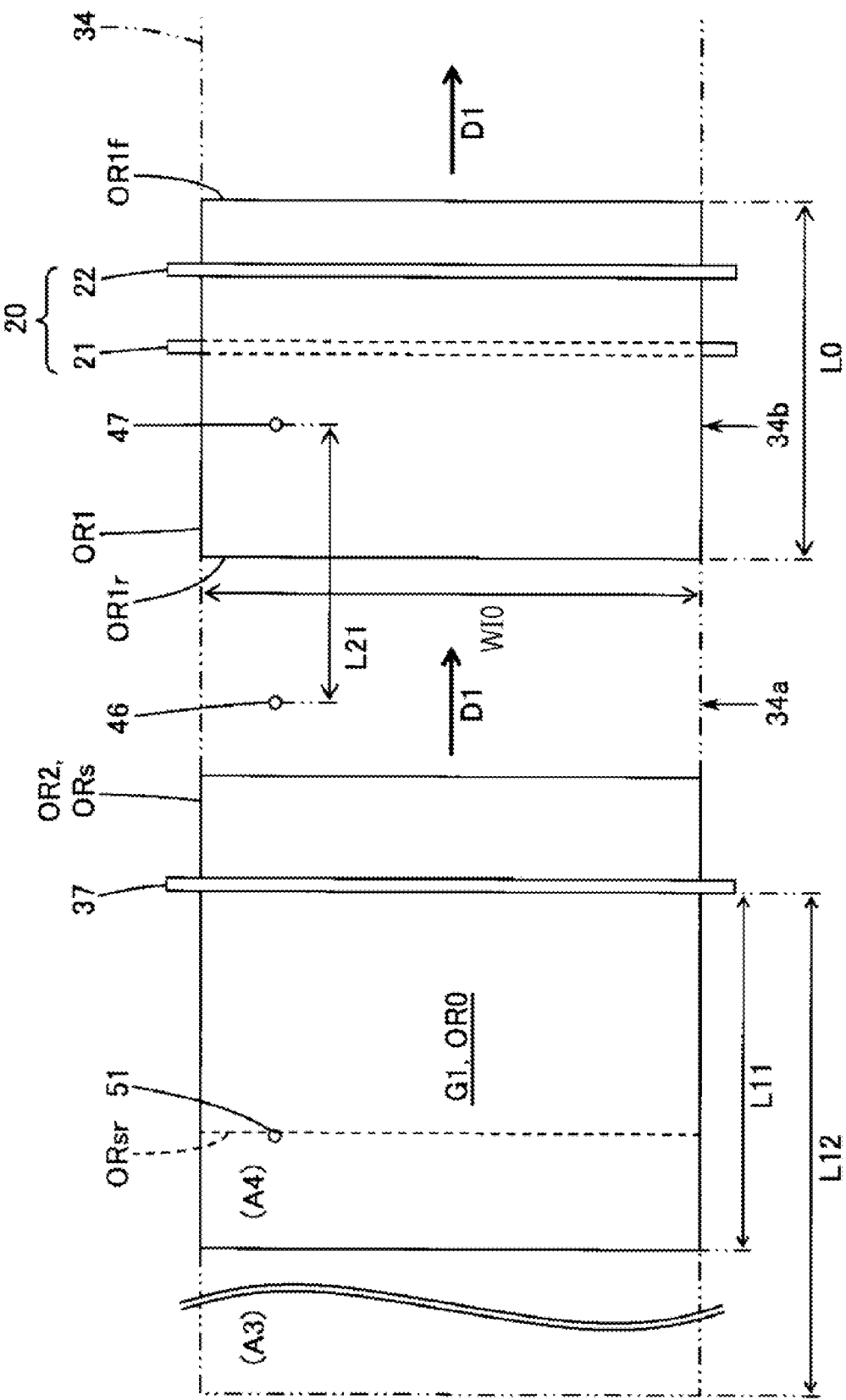
FIG. 2 is a plan view schematically illustrating an example of a main part of the image reading apparatus.
Figure 3:
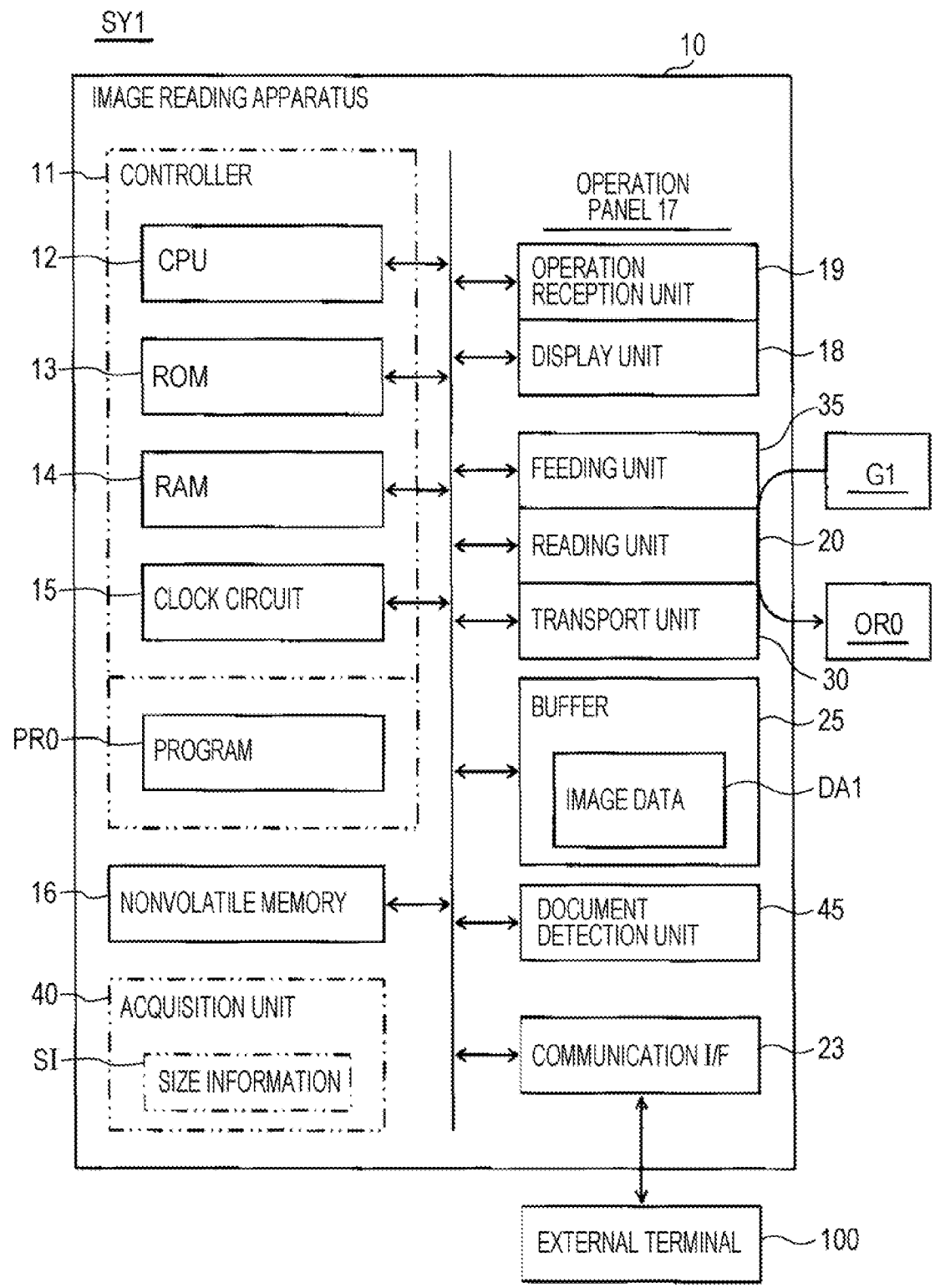
FIG. 3 is a block diagram schematically illustrating a configuration example of an image reading system.

As illustrated in FIGS. 1 to 3, an image reading apparatus 10 according to an embodiment of the present technology includes a reading unit 20, a storage unit (for example, a buffer 25), a transport unit 30, a feeding unit 35, a controller 11, and an acquisition unit 40. The reading unit 20 generates image data DA1 by reading a document OR0. The storage unit (25) stores the image data DA1. The transport unit 30 transports the document OR0 along a transport path 34 passing the reading unit 20. The feeding unit 35 transports the document OR0 separated from a document group G1 to the transport unit 30 along the transport path 34. The controller 11 stops the feeding operation of the feeding unit 35 after the leading end OR1f of a preceding document OR1 transported from the feeding unit 35 reaches the transport unit 30, and restarts the feeding operation after the rear end OR1r of the preceding document OR1 passes a predetermined position (for example, a first document detection position 34a). The acquisition unit 40 acquires size information SI representing the size of the preceding document OR1. When the size information SI indicates the first size, the controller 11 restarts the feeding operation a first time T1 after the rear end ORsr of a succeeding document ORs following the preceding document OR1 passes the predetermined position (34a). When the size information SI indicates a second size larger than the first size, the controller 11 restarts the feeding operation a second time T2 after the rear end ORsr of the succeeding document ORs passes the predetermined position (34a) where the second time T2 is longer than the first time T1.

As a result, when reading the first size document OR0, the period during which the feeding operation is stopped can be ended when the first time T1 which provides a high throughput suitable for the first size document OR0 elapses. When reading the second size document OR0 larger than the first size document OR0, the period during which the feeding operation is stopped can be ended when the second time T2 which provides a high throughput suitable for the second size document OR0 elapses. Therefore, in the embodiment, it is possible to provide an image reading apparatus capable of improving the throughput according to the size of the document when reading the document included in the document group.

Here, examples of the image reading apparatus includes a scanner, a facsimile, a multifunction machine having a function of reading a document and a function of outputting image data. The predetermined position as a reference for restarting the feeding operation may be between the document group and the transport unit in the transport path, or may be in the transport unit. Examples of the size information include various pieces of information such as information specified in the second embodiment to the fourth embodiment described later. The sizes of the document are not limited to two types of the first size and the second size, and may be three or more types. For example, when the size information indicates a third size larger than the second size, the controller may restart the feeding operation a third time after the rear end of the succeeding document passes the predetermined position where the third time is longer than the second time. The succeeding document may be a document transported immediately after the preceding document, or may be a thirdly or later transported document counted from the preceding document. In the present application, "first", "second", "third", . . . are terms for identifying each component, and do not mean an order. Note that the above remarks are also applied to the following embodiments.

Second Embodiment

Figure 5:
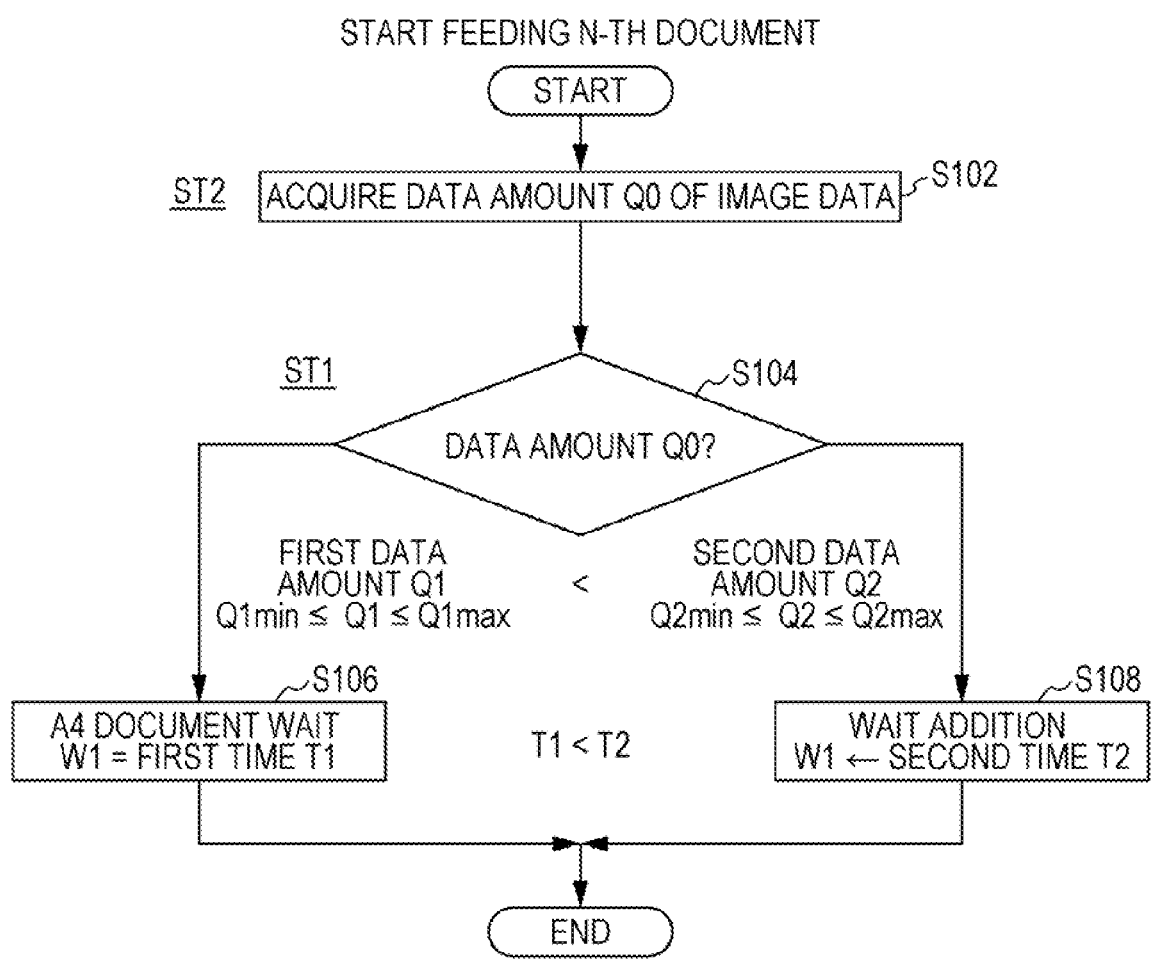
FIG. 5 is a flowchart illustrating an example of a wait management process performed by the image reading apparatus.
Figure 6:
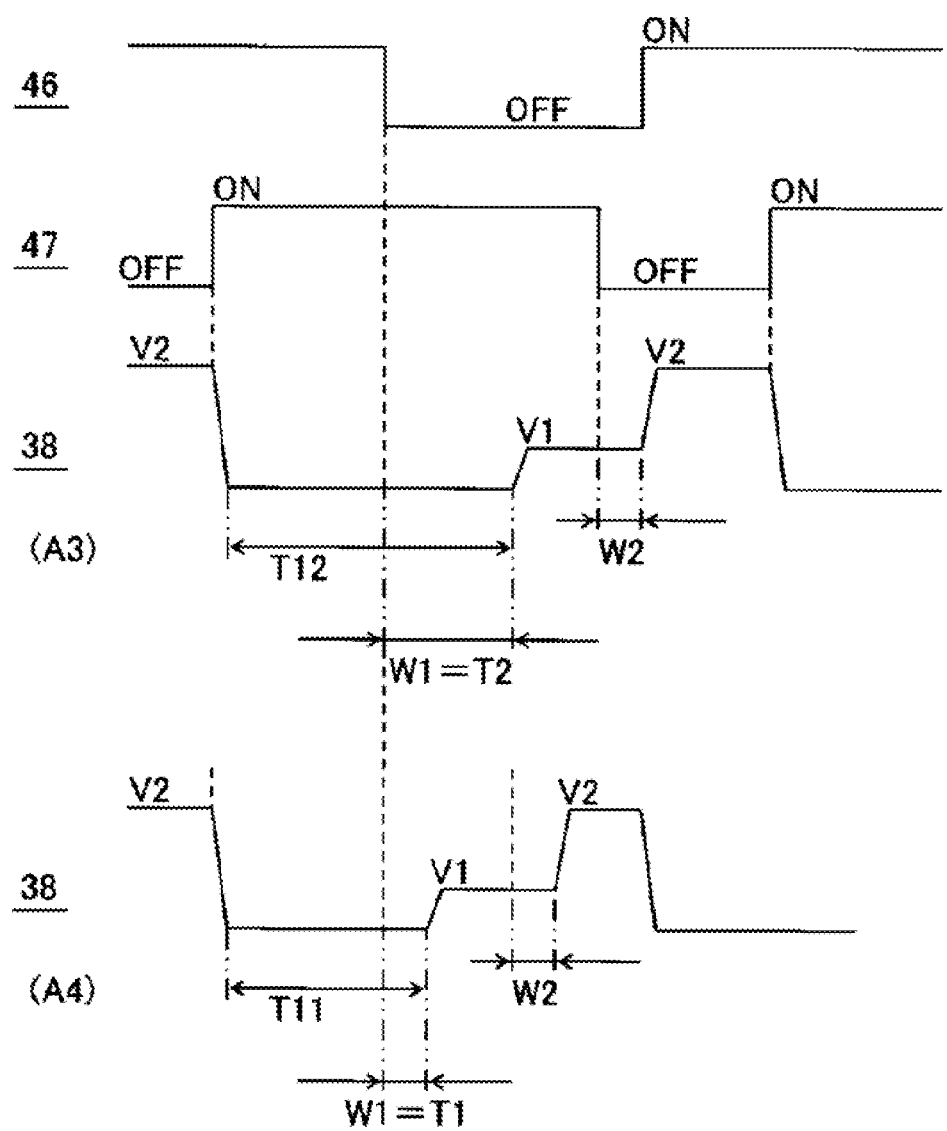
FIG. 6 is a diagram schematically illustrating an example of a timing chart according to the size of a document.

As illustrated in FIG. 5, the acquisition unit 40 may acquire the data amount Q0 of the image data DA1 stored in the storage unit (25) as the size information SI. As illustrated in FIGS. 5 and 6, when the data amount Q0 indicates the first data amount Q1 as the first size, the controller 11 may restart the feeding operation the first time T1 after the rear end ORsr of the succeeding document ORs passes the predetermined position (34a). When the data amount Q0 indicates the second data amount Q2 as the second size, the controller 11 may restart the feeding operation the second time T2 after the rear end ORsr of the succeeding document ORs passes the predetermined position (34a). Since the data amount Q0 of the image data DA1 has a high correlation with the image process time, it is possible to provide the suitable image reading apparatus that improves the throughput according to the size of the document according to the embodiment.

Third Embodiment

Figure 7:
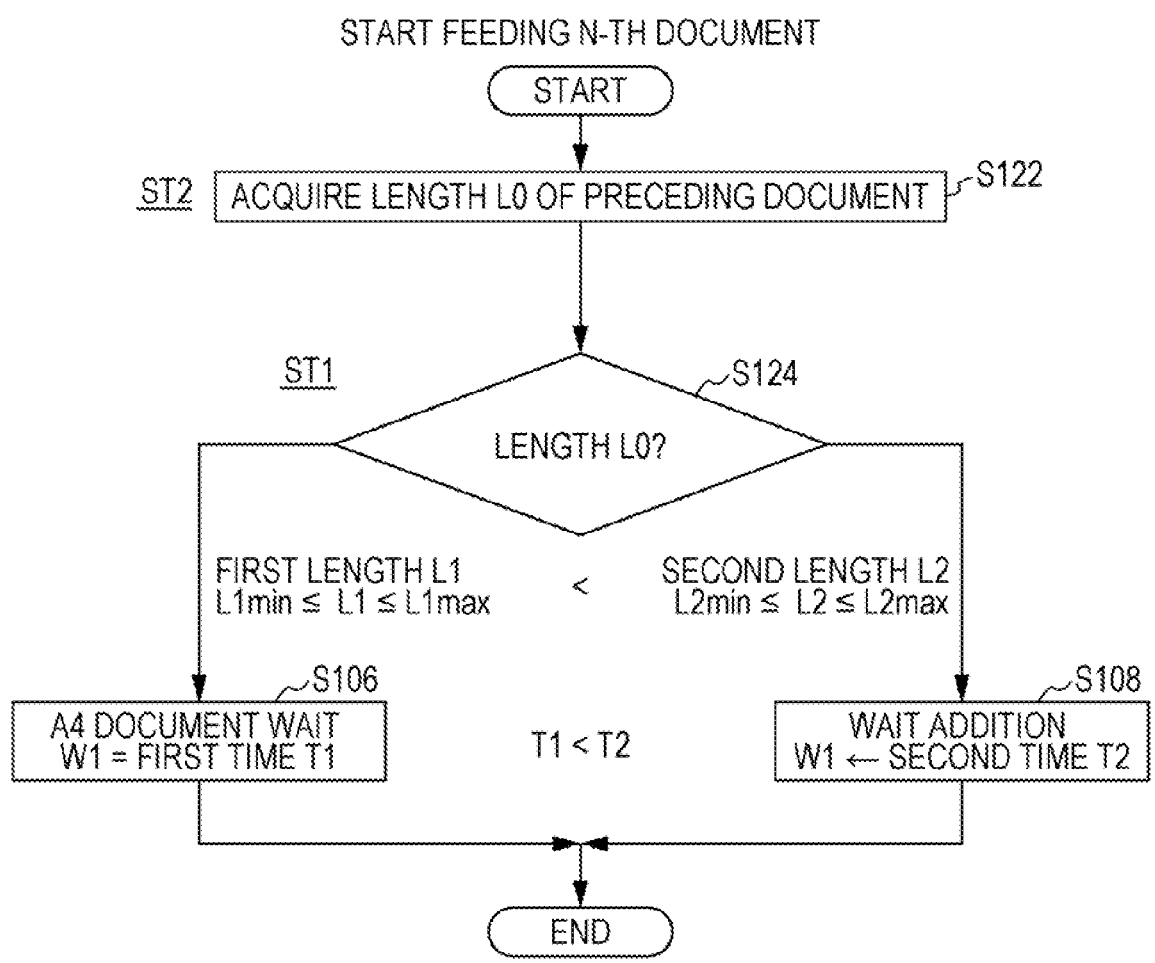
FIG. 7 is a flowchart illustrating another example of the wait management process performed by the image reading apparatus.

As illustrated in FIGS. 1 and 2, the acquisition unit 40 may include a document detection unit 45 that detects the presence or absence of the document OR0 at a document detection position (for example, the document detection positions 34a and 34b) in the transport path 34. As illustrated in FIG. 7, the acquisition unit 40 may acquire the length L0 of the preceding document OR1 along the transport path 34 as the size information SI based on the detection result of the document detection unit 45. As illustrated in FIGS. 6 and 7, when the length L0 indicates the first length L1 as the first size, the controller 11 may restart the feeding operation the first time T1 after the rear end ORsr of the succeeding document ORs passes the predetermined position (34a). When the length L0 indicates the second length L2 as the second size, the controller 11 may restart the feeding operation the second time T2 after the rear end ORsr of the succeeding document ORs passes the predetermined position (34a). In the embodiment, the stop period of the feeding operation can be set according to the length L0 of the document OR0, so that it is possible to provide the image reading apparatus capable of improving the throughput according to the size of the document in a simple process.

Here, the document detection position at the transport path may be the above-described predetermined position or a position different from the predetermined position, such as the position between the predetermined position and the document group. Further, the only one document detection position may be provided at the transport path, or the two or more document detection positions may be provided at the transport path. The above remarks are also applied to the following embodiments.

Fourth Embodiment

Figure 8:
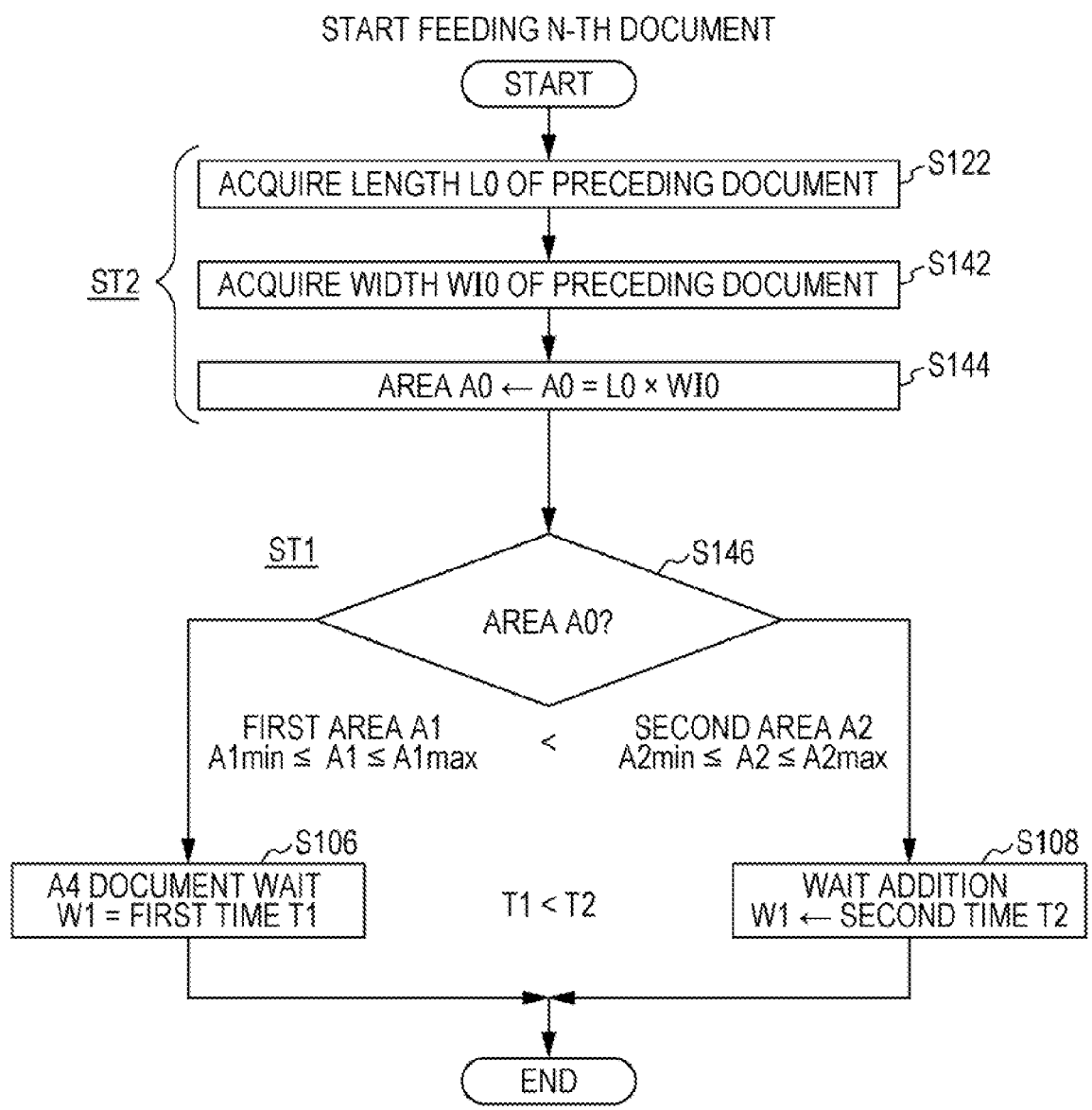
FIG. 8 is a flowchart illustrating another example of the wait management process performed by the image reading apparatus.

As illustrated in FIG. 8, the acquisition unit 40 may determine the length L0 of the preceding document OR1 along the transport path 34 based on the detection result of the document detection unit 45. The acquisition unit 40 may determine the width WI0 of the preceding document OR1 based on the reading result by the reading unit 20. The acquisition unit 40 may acquire the area A0 of the preceding document OR1 as the size information SI based on the length L0 and the width WI0. As illustrated in FIGS. 6 and 8, when the area A0 indicates a first area A1 as the first size, the controller 11 may restart the feeding operation the first time T1 after the rear end ORsr of the succeeding document ORs passes the predetermined position (34a). When the area A0 indicates a second area A2 as the second size, the controller 11 may restart the feeding operation the second time T2 after the rear end ORsr of the succeeding document ORs passes the predetermined position (34a). Since there is a correlation between the area a0 of the document OR0 and the time of the image process, it is possible to provide the suitable image reading apparatus that improves the throughput according to the size of the document although the embodiment is implemented by performing the simple process.

Fifth Embodiment

Figure 9:
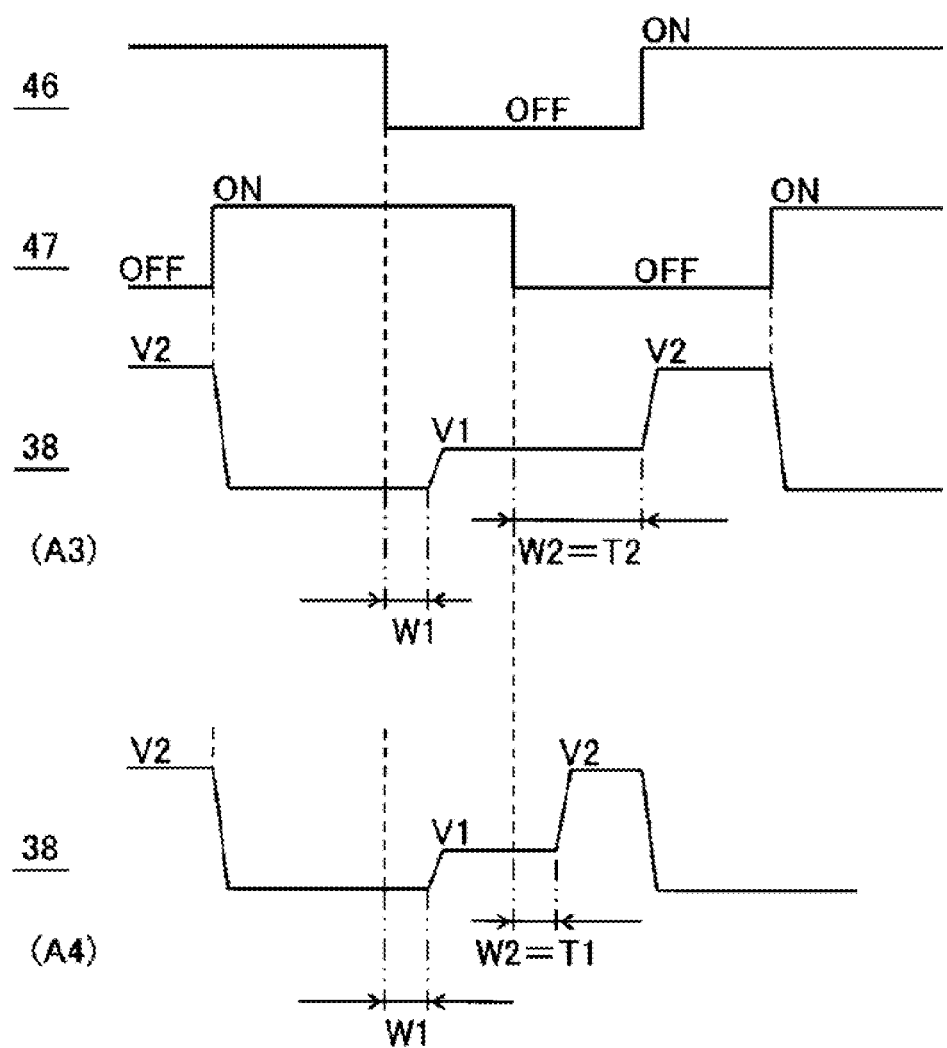
FIG. 9 is a diagram schematically illustrating an example of a timing chart according to the size of a document.
Figure 10:
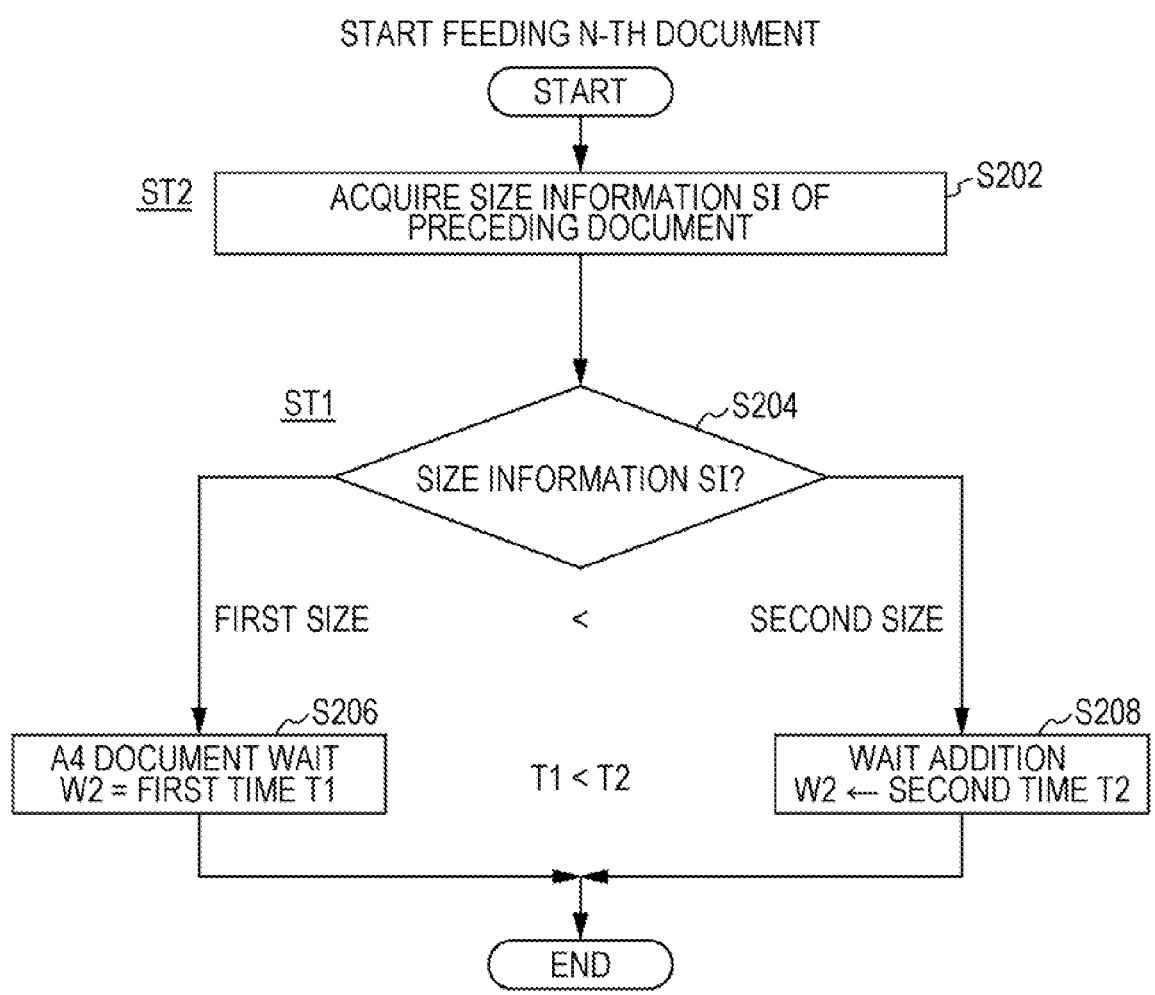
FIG. 10 is a flowchart illustrating another example of the wait management process performed by the image reading apparatus.
Figure 11:
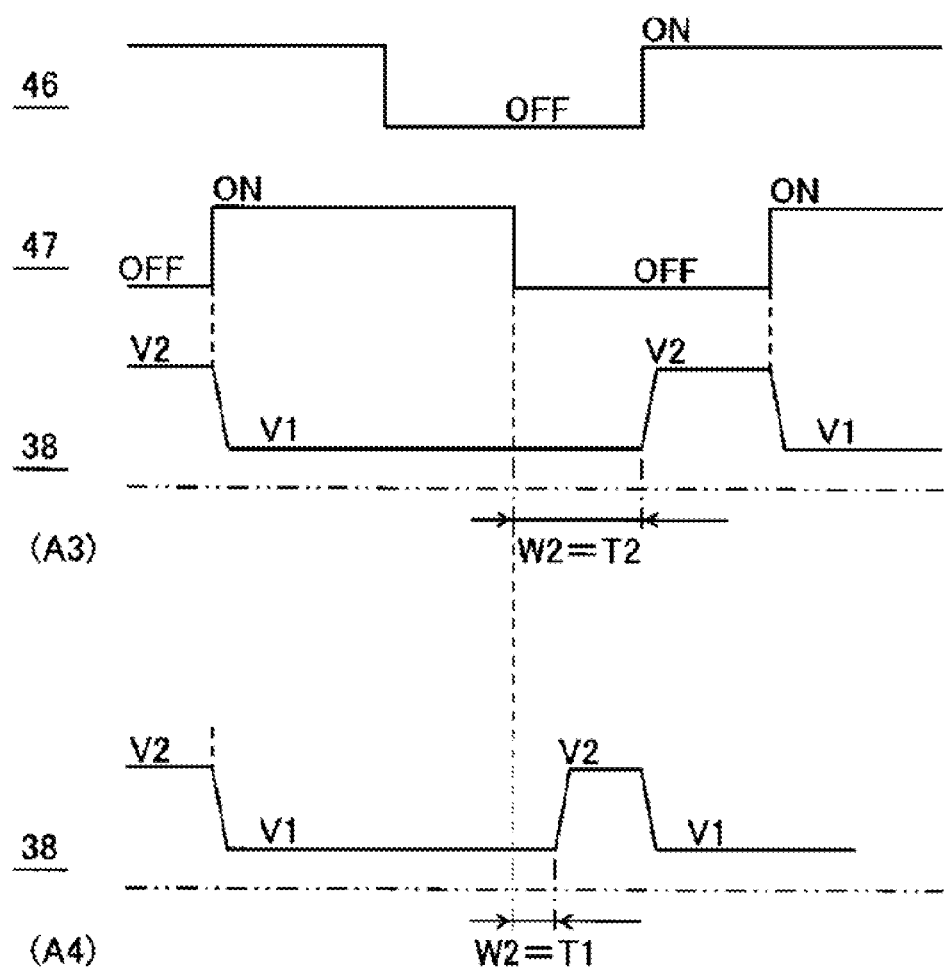
FIG. 11 is a diagram schematically illustrating an example of a timing chart according to the size of a document.

As exemplified in FIGS. 9 to 11, in the image reading apparatus 10 according to another embodiment of the present technology, the controller 11 sets the feeding operation of the feeding unit 35 at a first speed V1 or less after the leading end OR1f of the preceding document OR1 transported from the feeding unit 35 reaches the transport unit 30, and sets the feeding operation at a second speed V2 higher than the first speed V1 after the rear end OR1r of the preceding document OR1 passes a predetermined position (for example, a second document detection position 34b). When the size information SI indicates the first size, the controller 11 sets the feeding operation at the second speed V2 the first time T1 after the rear end ORsr of the succeeding document ORs following the preceding document OR1 passes the predetermined position (34b). When the size information SI indicates the second size larger than the first size, the controller 11 sets the feeding operation at the second speed V2 the second time T2 after the rear end ORsr of the succeeding document ORs passes the predetermined position (34b) where the second time T2 is longer than the first time T1.

As a result, when reading the first size document OR0, the period during which the feeding operation has a low speed can be ended when the first time T1 which provides a high throughput suitable for the first size document OR0 elapses. When reading the second size document OR0 larger than the first size document OR0, the period during which the feeding operation has a low speed can be ended when the second time T2 which provides a high throughput suitable for the second size document OR0 elapses. Therefore, in the embodiment, it is possible to provide an image reading apparatus capable of improving the throughput according to the size of the document when reading the document included in the document group. Here, setting the feeding operation of the feeding unit at the first speed or less includes setting the feeding operation at the first speed as illustrated in FIG. 11, stopping the feeding operation as illustrated in FIG. 9, and the like. This remark is also applied to the following embodiments.

Sixth Embodiment

Further, as illustrated in FIGS. 4 to 8, the control method according to an embodiment of the present technology is a method of controlling the image reading apparatus 10, and includes a first step ST1 and a second step ST2. In the first step ST1, the feeding operation of the feeding unit 35 is stopped after the leading end OR1f of a preceding document OR1 transported from the feeding unit 35 reaches the transport unit 30, and the feeding operation is restarted after the rear end OR1r of the preceding document OR1 passes a predetermined position (for example, the first document detection position 34a). In the second step ST2, size information SI representing the size of the preceding document OR1 is acquired. In the first step ST1, when the size information SI indicates the first size, the feeding operation is restarted the first time T1 after the rear end ORsr of the succeeding document ORs following the preceding document OR1 passes the predetermined position (34a). In the first step ST1, when the size information SI indicates the second size larger than the first size, the feeding operation is restarted the second time T2 after the rear end ORsr of the succeeding document ORs passes the predetermined position (34a) where the second time T2 is longer than the first time T1.

As a result, when reading the first size document OR0, the period during which the feeding operation is stopped can be ended when the first time T1 which provides a high throughput suitable for the first size document OR0 elapses. When reading the second size document OR0 larger than the first size document OR0, the period during which the feeding operation is stopped can be ended when the second time T2 which provides a high throughput suitable for the second size document OR0 elapses. Therefore, in the embodiment, it is possible to provide a method of controlling an image reading apparatus capable of improving the throughput according to the size of the document when reading the document included in the document group.

Further, the present technology is applicable to an image reading system including an image reading apparatus, a method of controlling the image reading system, a control program of the image reading apparatus, a control program of the image reading system, and a computer readable medium for recording any of the above-described control programs, and the like. The image reading apparatus or the image reading system may be composed of a plurality of distributed parts.

2. SPECIFIC EXAMPLE OF IMAGE READING APPARATUS

Figure 4:
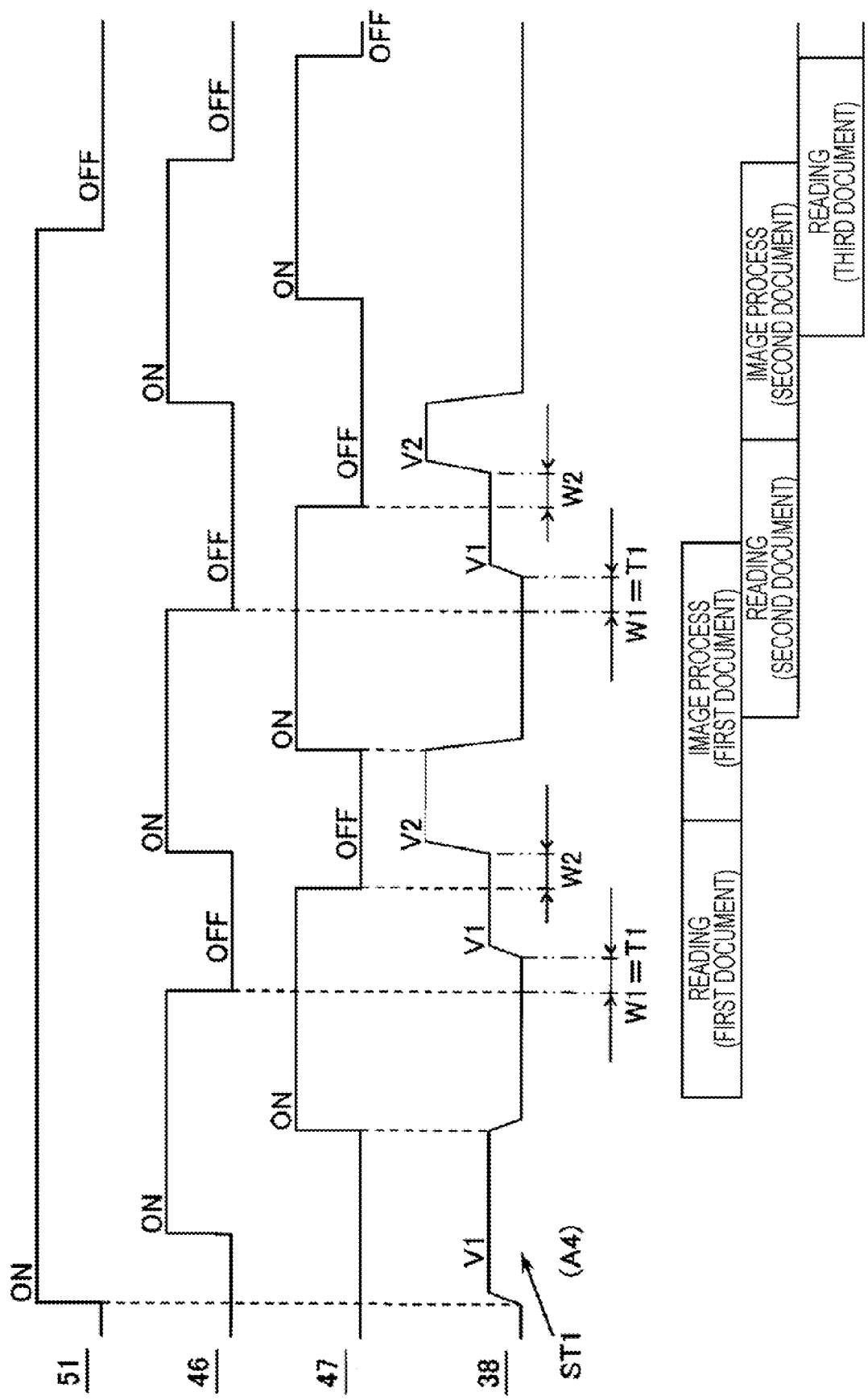
FIG. 4 is a diagram schematically illustrating an example of a timing chart of the image reading apparatus.

FIG. 1 schematically illustrates the configuration of the image reading apparatus 10. FIG. 2 is a plan view schematically illustrating a main part of the image reading apparatus 10. FIG. 3 schematically illustrates the configuration of an image reading system SY1 including the image reading apparatus 10. The image reading system SY1 illustrated in FIG. 3 includes the image reading apparatus 10 and one or more external terminals 100. FIG. 4 schematically illustrates a timing chart of the image reading apparatus 10. The image reading apparatus 10 includes the reading unit 20, the buffer 25 which is an example of a storage unit, the transport unit 30, the feeding unit 35, the controller 11, and the acquisition unit 40. The document OR0 to be read by the reading unit 20 is typically paper, but may be a sheet medium such as a synthetic resin sheet. Objects appearing in the document OR0 include characters, photographs, paintings, and the like. However, the document OR0 may include a blank sheet.

The reading unit 20 includes a light source that irradiates the document OR0 in the transport path 34 with light, image sensors 21 and 22 that perform photoelectric conversion, a light receiving optical system that guides reflected light from the document OR0 to the image sensors 21 and 22, and, an analog-to-digital conversion unit that converts an analog electric signal output from the image sensors 21 and 22 into a digital pixel value group, an image data storage processing unit that stores the image data DA1 based on the pixel value group in the buffer 25, and the like. The reading unit 20 illustrated in FIG. 1 reads the front surface of the document OR0 with the front surface image sensor 21 and reads the back surface of the document OR0 with the back surface image sensor 22. Therefore, the image reading apparatus 10 can read both sides of the document OR0 without using the reversing mechanism of the document OR0. After the light reflected from the object appearing on the document OR0 passes the light receiving optical system and is converted into an electric signal by the image sensors 21 and 22, the image data DA1 based on the pixel value group output from the image sensors 21 and 22 is stored in the buffer 25. Therefore, the image data DA1 is acquired by reading the document OR0 transported by the transport unit 30, and the image data DA1 is temporarily stored in the buffer 25. As described above, the reading unit 20 generates the image data DA1 by reading the document OR0.

The transport unit 30 includes a transport motor 31, a transport roller pair 32, a paper discharge roller pair 33, and the like, and transports the document OR0 in the transport direction D1 along the transport path 34 that passes the reading unit 20. The transport motor 31 is a servomotor having an encoder (not illustrated), and rotates the transport roller pair 32 and the paper discharge roller pair 33 simultaneously. Rotating the roller pair includes rotating only one roller of the two rollers included in the roller pair, and rotating both of the two rollers included in the roller pair. The transport roller pair 32 includes a first transport roller 32a that is in contact with the front surface of the document OR0, and a second transport roller 32b that is in contact with the back surface of the document OR0, and transports the nipped document OR0 toward the image sensors 21 and 22 by the rotation of the rollers 32a and 32b. The paper discharge roller pair 33 includes a first discharge roller 33a that is in contact with the front surface of the document OR0, and a second discharge roller 33b that is in contact with the back surface of the document OR0, and transports the nipped document OR0 toward a document stacker 53 by the rotation of the rollers 33a and 33b. The transport path 34 has the first document detection position 34a between the feeding unit 35 and the transport unit 30, and the second document detection position 34b in the transport unit 30. When the continuous reading process of the document group G1 is started, the transport motor 31 of this specific example constantly rotates the transport roller pair 32 and the paper discharge roller pair 33 except for the time of an error such as a jam.

The feeding unit 35 includes a set guide 36, a stopper 37, a paper feed motor 38, a paper feed roller pair 39, and the like, and transports the document OR0 separated from the document group G1 to the transport unit 30 along the transport path 34. The document group G1 refers to an aggregate in which a plurality of documents OR0 to be continuously read is overlapped. The document group G1 is set on the set guide 36. The stopper 37 prevents the document group G1 from moving in the transport direction D1 except for the document at the bottom of the document group G1. The paper feed motor 38 is a servomotor, and rotates the paper feed roller pair 39. The paper feed roller pair 39 includes a first paper feed roller 39a that is in contact with the front surface of the document OR0, and a second paper feed roller 39b that is in contact with the back surface of the document OR0, and transports the nipped document OR0 toward the transport roller pair 32 by the rotation of the rollers 39a and 39b. The paper feed motor 38 of this specific example temporarily stops the rotation of the transport roller pair 32 when the leading end of the document OR0 reaches the second document detection position 34b, restarts the rotation operation of the transport roller pair 32 after the rear end of the document OR0 reaches the first document detection position 34a. The feeding unit 35 that continuously transports a plurality of documents OR0 to the transport unit 30 is referred to as an ADF or an automatic paper feeding device. Here, the ADF is an abbreviation for an auto document feeder.

The image reading apparatus 10 illustrated in FIG. 3 include, as the electric system, a CPU 12, which is a processor, a ROM 13, which is a semiconductor memory, a RAM 14, which is a semiconductor memory, a clock circuit 15, a nonvolatile memory 16, an operation panel 17, the feeding unit 35, a reading unit 20, the transport unit 30, the buffer 25, and the document detection unit 45, and a communication interface 23. Here, the CPU is an abbreviation for a central processing unit, the ROM is an abbreviation for a read only memory, the RAM is an abbreviation for a random access memory, and the I/F illustrated in FIG. 3 is an abbreviation for an interface. The control program PRO that causes the computer to function as the image reading apparatus 10 is stored in at least one of the ROM 13 and the nonvolatile memory 16 and executed by the CPU 12. The CPU 12 executes the program PRO while using the RAM 14 as a work area to perform various processes such as a control process of the feeding unit 35, a control process of the reading unit 20, a control process of the transport unit 30, and a format conversion process of the image data DA1, which is read data of the document OR0. The above-described components 12 to 15 are an example of the controller 11. The processor constituting the controller 11 is not limited to one CPU, but may be a plurality of CPUs, a hardware circuit such as an ASIC, a combination of the CPU and the hardware circuit, or the like. Here, the ASIC is an abbreviation for an application specific integrated circuit.

The controller 11, as illustrated in FIG. 4, stops the feeding operation of the feeding unit 35 after the leading end OR1f of the preceding document OR1 transported from the feeding unit 35 reaches the transport unit 30, and restarts the feeding operation after the rear end OR1r of the preceding document OR1 passes the predetermined position. This specific example has a feature in which a wait W1 is changed according to the size information SI indicating the size of the preceding document OR1. The size information SI includes the data amount Q0 illustrated in FIG. 5, the document length L0 illustrated in FIG. 7, the document area A0 illustrated in FIG. 8, and the like. The image reading apparatus 10 also includes the acquisition unit 40 that acquires the size information SI. The controller 11 also performs an image process for converting the image data DA1 stored in the buffer 25 into a format such as a JPEG or a PDF. Here, the JPEG is an abbreviation for a joint photographic experts group.

Examples of the nonvolatile memory 16 may include a semiconductor memory such as a flash memory, a magnetic recording medium such as a hard disk. When the program PRO is stored, the nonvolatile memory 16 becomes a computer-readable medium on which the program PRO is recorded.

The operation panel 17 includes a display unit 18 that displays a screen, and an operation reception unit 19 that receives an operation on the screen. An example of the display unit 18 may include a display panel such as a liquid crystal panel. Examples of the operation reception unit 19 may include the touch panel, hard keys including a keyboard.

The buffer 25 temporarily stores the image data DA1 generated by the reading unit 20. An example of the buffer 25 may include a RAM. The buffer 25 may be disposed in a site different from the RAM 14 in the image reading apparatus 10 or may be a partial area allocated to the RAM 14. That is, the buffer 25 and the RAM 14 may be located at positions separated from each other in the image reading apparatus 10 or may be integrated.

As illustrated in FIGS. 1 and 2, the document detection unit 45 includes a first document detection sensor 46 disposed at the first document detection position 34a, and a second document detection sensor 47 disposed at the second document detection position 34b. The first document detection sensor 46 includes a transmission unit 46a facing the front surface of the document OR0, and a reception unit 46b facing the back surface of the document OR0, and detects whether the document OR0 is present at the first document detection position 34a. Examples of the first document detection sensor 46 may include a non-contact sensor such as an optical sensor, and a contact sensor, or may include a sensor without the transmission unit 46a. The second document detection sensor 47 detects whether the document OR0 is present at the second document detection position 34b. Examples of the second document detection sensor 47 may include a non-contact sensor such as an optical sensor, and a contact sensor.

The communication interface 23 transmits and receives data to and from the external terminal 100 coupled by wire or wireless according to a predetermined communication protocol. The connection between the communication interface 23 and the external terminal 100 may be a network connection such as a LAN or the Internet, or a local connection such as a USB connection. Here, the LAN is an abbreviation for a local area network, and the USB is an abbreviation for a Universal Serial Bus.

The external terminal 100 that can be used for the image reading system SY1 is not particularly limited to a computer such as a personal computer or a tablet terminal, a mobile phone such as a smartphone, or the like. The image reading apparatus 10 can transmit the format-converted image data DA1 to the external terminal 100.

The image reading apparatus 10 illustrated in FIGS. 1 and 2 further includes a document group detection sensor 51, a multi feed detection sensor 52, and the stacker 53. The document group detection sensor 51 detects whether the document group G1 is set on the set guide 36. Examples of the document group detection sensor 51 may include a non-contact sensor such as an optical sensor, and a contact sensor. The multi feed detection sensor 52 includes an ultrasonic transmission unit 52a facing the back surface of the document OR0, and an ultrasonic reception unit 52b facing the front surface of the document OR0, and detects whether a plurality of documents OR0 is transported from the feeding unit 35 in an overlapping state. The document OR0 discharged from the paper discharge roller pair 33 is stacked on the stacker 53. As a result, the document OR0 separated from the document group G1 is transported from the feeding unit 35 to the transport unit 30 along the transport path 34, read by the reading unit 20 while being transported to the transport unit 30, and, finally, stacked on the stacker 53.

Note that the image reading apparatus 10 is not limited to a scanner-dedicated machine, but may be a multifunction machine also having at least some of a print function, a facsimile communication function, an e-mail transmission function, and the like. The image reading apparatus 10 may include all components in one housing, or may include a plurality of devices communicably divided.

Next, an example of a continuous reading operation of the image reading apparatus 10 will be described with reference to FIGS. 1 to 4, in particular, FIG. 4. Here, it is assumed that the document group G1 includes three A4 size documents OR0, and the continuous reading operation starts when the document group G1 is set on the set guide 36 as a trigger. The transport motor 31 keeps rotating the roller pairs 32 and 33 while the document group detection sensor 51 is turned ON. When the document group G1 is set on the set guide 36, the document group detection sensor 51 switches from OFF to ON, and the paper feed motor 38 rotates the paper feed roller pair 39 at the first speed V1 as a low speed. As a result, a first document is transported from the feeding unit 35, and when the leading end of the document reaches the first document detection position 34a, the first document detection sensor 46 switches from OFF to ON. Thereafter, the leading end of the document is nipped by the transport roller pair 32, and the leading end of the document reaches the transport unit 30. When the leading end of the document reaches the second document detection position 34b, the second document detection sensor 47 switches from OFF to ON. When the second document detection sensor 47 is turned ON, the paper feed motor 38 temporarily stops the rotation of the paper feed roller pair 39. The first document is transported in the transport direction D1 while being nipped by the transport roller pair 32. As a result, the first document is read by the reading unit 20 while being transported by the transport unit 30, and a second document is in a standby state until a sufficient area is created in the buffer 25.

When the rear end of the first document reaches the first document detection position 34a, the first document detection sensor 46 switches from ON to OFF. After the lapse of the wait W1 from this time, the paper feed motor 38 rotates the paper feed roller pair 39 at the first speed V1 as a low speed. The wait W1 corresponds to the end timing of the period during which the feeding operation between the documents is temporarily stopped. When the rear end of the first document reaches the second document detection position 34b, the second document detection sensor 47 switches from ON to OFF. After the lapse of a wait W2 from this time, the paper feed motor 38 rotates the paper feed roller pair 39 at the second speed V2 as a high speed. The wait W2 corresponds to the end timing of the low speed period after the restart of the feeding operation. When the leading end of the second document reaches the first document detection position 34a, the first document detection sensor 46 switches from OFF to ON. Thereafter, the leading end of the document is nipped by the transport roller pair 32, and the leading end of the document reaches the transport unit 30. When the leading end of the document reaches the second document detection position 34b, the second document detection sensor 47 switches from OFF to ON. When the second document detection sensor 47 is turned ON, the paper feed motor 38 temporarily stops the rotation of the paper feed roller pair 39. The second document is transported in the transport direction D1 while being nipped by the transport roller pair 32. As a result, the second document is read by the reading unit 20 while being transported by the transport unit 30, and a third document is in a standby state until a sufficient area is created in the buffer 25. Note that the third document is fed in the same manner as the second document is fed, and a detailed description is omitted.

As a result, the controller 11 restarts the feeding operation the wait W1 after the rear end ORsr of the succeeding document ORs following the preceding document OR1 passes the first document detection position 34a. Further, every time the image data DA1 is stored in the buffer 25 when the document OR0 is read, the controller 11 performs an image process for converting the image data DA1 into an output format. When the image process is completed, the area where the image data DA1 was stored in the buffer 25 is released, so that it is possible to store, in the buffer 25, the image data DA1 to be generated by reading the document OR0 later.

In order to increase the throughput of the image reading process, it is necessary to increase the feeding speed of each document OR0 by the feeding unit 35. However, as described above, it is necessary to temporarily stop the feeding operation of the feeding unit 35 between documents in order to secure time for an image process. The wait W1 illustrated in FIG. 4 is set so that the throughput is the highest when reading the A4 size document. The wait W1 in this case will be referred to as a first time T1.

The document size includes not only A4 size but also A3 size. When reading an A3 size document, the above period may not be enough to perform the image process, and in some cases, the feeding operation restarted to feed the succeeding document to the reading unit 20 must be temporarily stopped.

FIG. 12 schematically illustrates a timing chart when the wait W1 is the first time T1 for the A4 size and an A3 size document is read. When the rear end of the preceding document reaches the first document detection position 34a after the paper feed motor 38 temporarily stops the rotation of the paper feed roller pair 39 when the second document detection sensor 47 switches from OFF to ON, the first document detection sensor 46 switches from ON to OFF. The paper feed motor 38 rotates the paper feed roller pair 39 at the first speed V1 the first time T1 after this time. However, when the image process is not completed when the second document detection sensor 47 is switched from ON to OFF as the rear end of the preceding document reaches the second document detection position 34b, the succeeding document cannot be read, so that it is necessary to stop the rotation of the paper feed roller pair 39. In this case, the reading unit 20 issues a temporary stop command to the paper feed motor 38 at timing t1, and the paper feed motor 38 stops the rotation of the paper feed roller pair 39. Thereafter, when the reading unit 20 issues a restart command to the paper feed motor 38 at timing t2 as the image process ends, the paper feed motor 38 first rotates the paper feed roller pair 39 at the first speed V1, and further, rotates the paper feed roller pair 39 at the second speed V2.

As illustrated in FIG. 12, when the restarted feeding operation is temporarily stopped, it takes time to return to the original feeding operation, so that the throughput of the image reading process is greatly reduced. In an image reading apparatus in which the throughput of the process for reading the A4 size documents is 90 ppm, when a test for reading the A3 size documents was performed, the throughput was actually 42 ppm although the throughput would have been 56 ppm without a temporary stop command. Here, ppm refers to the number of documents read in one minute. However, when the wait W1 is uniformly increased according to the A3 size document, the throughput of the process for reading the A3 size document decreases. Therefore, in this specific example, as illustrated in FIG. 6, the temporal stop of the restarted feeding operation is suppressed by setting the wait W1 to the second time T2 longer than the first time T1 for the A4 size when the document has the A3 size. When a test for reading the A3 size documents was performed with W1 set to T2, the throughput of the image reading process was restored to 50 ppm. As described above, in this specific example, it is possible to improve the throughput when reading the A3 size document while maintaining the throughput when reading the A4 size document.

3. SPECIFIC EXAMPLE 1 OF PROCESSING PERFORMED BY IMAGE READING APPARATUS

FIG. 5 schematically illustrates a wait management process performed by the image reading apparatus 10. This process starts when an n-th document OR0 starts to be fed. Here, step S102 corresponds to the acquisition unit 40 and the second step ST2. Steps S104 to S108 correspond to the controller 11 and the first step ST1. Hereinafter, the description of "step" is omitted. The image reading apparatus 10 performs a plurality of processes in parallel by a multitask. FIG. 6 schematically illustrates a timing chart according to the size of the document OR0. It is assumed that the document OR0 has two types, the A4 size and the A3 size. In this case, the A4 size is an example of the first size, and the A3 size is an example of the second size. Hereinafter, description will be made with reference to FIG. 6 and FIGS. 2 to 4.

When the wait management process starts, the acquisition unit 40 acquires the data amount Q0 of the image data DA1 stored in the buffer 25 as the size information SI in S102. In this case, the acquisition unit 40 can be configured by the CPU 12, the ROM 13, and the RAM 14. The data amount Q0 is the data amount of the image data DA1 acquired by reading the preceding document OR1.

Next, in S104, the controller 11 branches the process according to the data amount Q0. For example, the first data amount Q1 assumed as the A4 size can be set to the minimum data amount Q1min or more and the maximum data amount Q1max or less. The second data amount Q2 assumed as the A3 size can be set to the minimum data amount Q2min or more and the maximum data amount Q2max or less. That is, the following relationships are established.

$$Q1\min \leq Q1 \leq Q1\max$$

$$Q2\min \leq Q2 \leq Q2\max$$

where Q1max<Q2min.

When Q1min≤Q0≤Q1max, the data amount Q0 indicates the first data amount Q1. In this case, the controller 11 advances the process to S106, and sets the wait W1 to the first time T1 for the A4 size. Therefore, when the data amount Q0 indicates the first data amount Q1 as the first size, the controller 11 restarts the feeding operation the first time T1 after the rear end ORsr of the succeeding document ORs passes the first document detection position 34*a*. Since the first time T1 is set so as to obtain a high throughput when reading the A4 size document, the throughput of the process for reading the A4 size document is good. Thereafter, the controller 11 ends the wait management process.

On the other hand, when Q2min≤Q0≤Q2max, the data amount Q0 indicates the second data amount Q2. In this case, the controller 11 advances the process to S108, adds a wait compared to the wait for the A4 size, and sets the wait W1 to the second time T2 for the A3 size. Therefore, when the data amount Q0 indicates the second data amount Q2 as the second size, the controller 11 restarts the feeding operation the second time T2 after the rear end ORsr of the succeeding document ORs passes the first document detection position 34*a*. Since the second time T2 is set so as to obtain a high throughput when reading an A3 size document, the throughput of the process for reading the A3 size document is good. Thereafter, the controller 11 ends the wait management process.

When the image reading process of the first document is completed as illustrated in FIG. 4, in other words, when the image process for the first document is started, the high-speed feeding of the second document is started. That is, when the image reading process of the preceding document OR1 is completed, the high-speed feeding of an immediately following document OR2 is started. Therefore, the wait W1 of S106 and S108 is applied to the succeeding document ORs which is a third document counted from the preceding document OR1. Of course, the present technology also includes an embodiment in which the wait W1 of S106 and S108 is applied to the succeeding document ORs which is a fourth or later document counted from the preceding document OR1.

As explained above, when reading the A4 size document, the wait W1 is set to the relatively short first time T1 which provides a high throughput suitable for the A4 size, so that the high throughput can be obtained when reading the A4 size document. When reading the A3 size document, the wait W1 is set to the relatively long second time T2 that provides a high throughput suitable for the A3 size, so that the high throughput can be obtained when reading the A3 size document. In addition, since the temporal stop of the paper feed motor 38 is suppressed, the discomfort given to the user is also suppressed. Further, since the data amount Q0 of the image data DA1 has a high correlation with the image process time, it is possible to provide a suitable image reading apparatus that improves the throughput according to the size of the document when reading the document included in the document group according to the present specific example.

When there are three or more document sizes, the wait management process according to the document size can be performed by increasing the number of branches in S104. This idea is also applied to the specific examples described below. For example, assuming that there are three types of documents, the A4 size, the B4 size, and the A3 size, the A4 size corresponds to the first size, the B4 size corresponds to the second size, and the A3 size corresponds to the third size. For example, the first data amount Q1 assumed as the A4 size can be set to the minimum data amount Q1min or more and the maximum data amount Q1max or less. The second data amount Q2 assumed as the B4 size can be set to the minimum data amount Q2min or more and the maximum data amount Q2max or less. The third data amount Q3 assumed as the A3 size can be set to the minimum data amount Q3min or more and the maximum data amount Q3max or less. That is, the following relationships are established.

$$Q1\min \leq Q1 \leq Q1\max$$

$$Q2\min \leq Q2 \leq Q2\max$$

$$Q3\min \leq Q3 \leq Q3\max$$

where Q1max<Q2min and Q2max<Q3min.

When Q1min≤Q0≤Q1max, the controller 11 sets the wait W1 to the first time T1 for the A4 size. When Q2min≤Q0≤Q2max, the controller 11 sets the wait W1 to the second time T2 for the B4 size. When Q3min≤Q0≤Q3max, the controller 11 sets the wait W1 to the third time T3 for the A3 size. Of course, T1<T2<T3. As a result, when reading a document included in the document group, the throughput is improved according to the size of the document.

4. SPECIFIC EXAMPLE 2 OF PROCESSING PERFORMED BY IMAGE READING APPARATUS

Instead of the process illustrated in FIG. 5, the wait management process illustrated in FIG. 7 may be performed. This process differs from the process illustrated in FIG. 5 in that S102 to S104 are replaced with S122 to S124. Hereinafter, description will be made with reference to FIG. 7 and FIGS. 1 to 4.

When the wait management process starts, the acquisition unit 40 acquires in S122 the length L0 of the preceding document OR1 along the transport path 34 as the size information SI based on the detection results of the document detection sensors 46 and 47. The acquisition unit 40 in this case can be configured by the CPU 12, the ROM 13, the RAM 14, and the document detection sensors 46 and 47. For example, as illustrated in FIG. 2, the length from the first document detection sensor 46 to the second document detection sensor 47 in the transport direction D1 is a length L21. Further, the distance over which the preceding document OR1 moves from when the second document detection sensor 47 detects the leading end OR1f of the preceding document OR1 by the changeover from OFF to ON to when the first document detection sensor 46 detects the rear end OR1r of the preceding document OR1 by the changeover from ON to OFF is a distance L22. The distance L22 is obtained by counting the pulses output, from the encoder of the transport motor 31, from when the leading end OR1f is detected by the second document detection sensor 47 to when the rear end OR1r is detected by the first document detection sensor 46. The length L0 of the preceding document OR1 is L21+L22. Therefore, the acquisition unit 40 may calculate L0=L21+L22.

Next, in S124, the controller 11 branches the process according to the length L0. For example, the first length L1 assumed as the A4 size can be set to the minimum length L1 min or more and the maximum length L1max or less. The second length L2 assumed as the A3 size can be set to the minimum length L2min or more and the maximum length L2max or less. That is, the following relationships are established.

$$L1\ \text{min} \leq L1 \leq L1\text{max}$$

$$L2\text{min} \leq L2 \leq L2\text{max}$$

where L1max<L2min.

When L1 min≤L0≤L1max, the length L0 indicates the first length L1. In this case, the controller 11 advances the process to S106, and sets the wait W1 to the first time T1 for the A4 size. Therefore, when the length L0 indicates a first length L1 as the first size, the controller 11 restarts the feeding operation after the first time T1 from the time when the rear end ORsr of the succeeding document ORs passes the first document detection position 34a. Thereafter, the controller 11 ends the wait management process.

On the other hand, when L2min≤L0≤L2max, the length L0 indicates the second length L2. In this case, the controller 11 advances the process to S108, and sets the wait W1 to the second time T2 for the A3 size. Therefore, when the length L0 indicates the second length L2 as the second size, the controller 11 restarts the feeding operation the second time T2 after the rear end ORsr of the succeeding document ORs passes the first document detection position 34a. Thereafter, the controller 11 ends the wait management process.

As illustrated in FIG. 4, since the feeding of the next document OR2 is started after the first document detection sensor 46 detects the rear end OR1r of the preceding document OR1, the wait W1 of S106 and S108 is applied to the next document OR2. That is, the wait W1 of S106 and S108 is applied to the succeeding document ORs which is the second document counted from the preceding document OR1. Of course, the present technology also includes the case where the wait W1 of S106 and S108 is applied to the succeeding document ORs which is the third or later document counted from the preceding document OR1.

As described above, even in a simple process in which the length L0 of the document OR0 is used, it is possible to improve the throughput according to the size of the document. The length L0 is acquired by calculating the distance over which the preceding document OR1 moves from when the first document detection sensor 46 detects the leading end OR1f of the preceding document OR1 to when it detects the rear end OR1r of the preceding document OR1. The length L0 is acquired by calculating the distance over which the preceding document OR1 moves from when the second document detection sensor 47 detects the leading end OR1f of the preceding document OR1 to when it detects the rear end OR1r of the preceding document OR1.

As illustrated in FIG. 2, when the document OR0 has the A4 size, the document OR0 is transported with the longitudinal direction of the document OR0 orthogonal to the transport direction D1. When the document OR0 has the A3 size, the document OR0 is transported with the longitudinal direction of the document OR0 directed in the transport direction D1. Therefore, the width WI0 of the document OR0 is the same in both of the A4 size and the A3 size. The length L12 of the A3 size in the transport direction D1 is twice as long as the length L11 of the A4 size in the transport direction D1. Also, as illustrated in FIG. 6, when the document OR0 has the A4 size, the first period in which the feeding operation of the paper feed motor 38 is stopped between the documents is T11, and when the document OR0 has the A3 size, the second period during which the feeding operation of the paper feed motor 38 is stopped between the documents is T12. The second period T12 is longer than the first period T11 by the time obtained by subtracting the first time T1 from the second time T2. The second period T12 is smaller than twice the first period T11. By setting the relationship to T12<2×T11, the throughput when reading the A3 size document is further improved.

Here, when the length L0 of the document OR0 is the first length L1, the first period in which the feeding operation of the paper feed motor 38 is stopped between the documents is T11, and when the length L0 is the second length L2, the second period during which the feeding operation of the paper feed motor 38 is stopped between the documents is T12. The ratio T12/L2 obtained by dividing the second period T12 by the second length L2 is smaller than the ratio T11/L1 obtained by dividing the first period T11 by the first length L1. By setting the relationship to (T12/L2)<(T11/L1), the throughput when reading the second size document is further improved.

5. SPECIFIC EXAMPLE 3 OF PROCESSING PERFORMED BY IMAGE READING APPARATUS

Instead of the process illustrated in FIG. 7, the wait management process illustrated in FIG. 8 may be performed. This process differs from the process illustrated in FIG. 7 in that S142 to S144 are added immediately after S122, and S124 is replaced with S146. The acquisition unit 40 corresponding to S122 and S142 to S144 can be configured by the CPU 12, the ROM 13, the RAM 14, the document detection sensors 46 and 47, and the reading unit 20. Hereinafter, description will be made with reference to FIG. 8 and FIGS. 1 to 4.

When the wait management process starts, the acquisition unit 40 acquires in S122 the length L0 of the preceding document OR1 along the transport path 34 based on the detection results of the document detection sensors 46 and 47. Next, in S142, the acquisition unit 40 obtains the width WI0 of the preceding document OR1 based on the reading result by the front surface image sensor 21. For example, the length of the front surface image sensor 21 excluding the both ends out from the document OR0 can be set to the width WI0 based on a pixel value group corresponding to an output from the front surface image sensor 21. Further, in S144, the acquisition unit 40 acquires the area A0 of the preceding document OR1 as the size information SI based on the length L0 and the width WI0. For example, the acquisition unit 40 may calculate A0=L0×WI0.

Next, in S146, the controller 11 branches the process according to the area A0. For example, the first area A1 assumed as the A4 size can be set to the minimum area A1min or more and the maximum area A1max or less. The second area A2 assumed as the A3 size can be set to the minimum area A2min or more and the maximum area A2max or less. That is, the following relationships are established.

$$A1min \leq A1 \leq A1max$$

$$A2min \leq A2 \leq A2max$$

where A1max<A2min.

When A1min≤A0≤A1max, the area A0 indicates the first area A1. In this case, the controller 11 advances the process to S106, and sets the wait W1 to the first time T1 for the A4 size. Therefore, when the area A0 indicates the first area A1 as the first size, the controller 11 restarts the feeding operation the first time T1 after the rear end ORsr of the succeeding document ORs passes the first document detection position 34a. Thereafter, the controller 11 ends the wait management process.

On the other hand, when A2min≤A0≤A2max, the area A0 indicates the second area A2. In this case, the controller 11 advances the process to S108, and sets the wait W1 to the second time T2 for the A3 size. Therefore, when the area A0 indicates the second area A2 as the second size, the controller 11 restarts the feeding operation the second time T2 after the rear end ORsr of the succeeding document ORs passes the first document detection position 34a. Thereafter, the controller 11 ends the wait management process.

As illustrated in FIG. 4, since the feeding of the next document OR2 is started after the front surface image sensor 21 starts reading the preceding document OR1, the wait W1 of S106 and S108 is applied to the next document OR2. That is, the wait W1 of S106 and S108 is applied to the succeeding document ORs which is the second document counted from the preceding document OR1. Of course, the present technology also includes the case where the wait W1 of S106 and S108 is applied to the succeeding document ORs which is the third or later document counted from the preceding document OR1.

Since there is a correlation between the area A0 of the document OR0 and the time of the image process, it is possible to improve the throughput according to the size of the document although the this specific example is implemented by performing the simple process in which the length L0 and the width WI0 of the document OR0 are used. The width WI0 may be acquired based on a pixel value group corresponding to the output from the back surface image sensor 22, or may be acquired based on a pixel value group corresponding to the output from both of the image sensors 21 and 22.

6. SPECIFIC EXAMPLE 4 OF PROCESSING PERFORMED BY IMAGE READING APPARATUS

As illustrated in FIG. 9, instead of the wait W1 which is the period in which the feeding operation is stopped, the wait W2 which is the low speed period after the restart of the feeding operation can be set according to the size of the document. In FIG. 9, when the rear end OR1r of the preceding document OR1 reaches the first document detection position 34a, the first document detection sensor 46 switches from ON to OFF. After the lapse of the wait W1 from this time, the paper feed motor 38 rotates the paper feed roller pair 39 at the first speed V1 as a low speed. The wait W1 is constant regardless of the size of the document OR0. When the rear end OR1r of the preceding document OR1 reaches the second document detection position 34b, the second document detection sensor 47 switches from ON to OFF. After the lapse of the wait W2 from this time, the paper feed motor 38 rotates the paper feed roller pair 39 at the second speed V2 as a high speed. The wait W2 is a relatively short first time T1 when the document OR0 has the A4 size, and is a relatively long second time T2 when the document OR0 has the A3 size.

FIG. 10 schematically illustrates the wait management process performed according to the timing illustrated in FIG. 9. Here, S202 corresponds to the acquisition unit 40 and the second step ST2. S204 to S208 correspond to the controller 11 and the first step ST1. When the wait management process starts, the acquisition unit 40 acquires, in S202, the size information SI representing the size of the preceding document OR1. The process of S202 may be any of the process for acquiring the data amount Q0 in S102 illustrated in FIG. 5, the process for acquiring the length L0 in S122 illustrated in FIG. 7, and the process for acquiring the area A0 in S122, and S142 to S144 illustrated in FIG. 8.

Next, in S204, the controller 11 branches the process according to the size information SI. When the size information SI indicates the first size, the controller 11 advances the process to S206, and sets the wait W2 to the first time T1 for the A4 size. In this case, the controller 11 changes the feeding operation from the first speed V1 as a low speed to the second speed V2 as a high speed the first time T1 after the rear end ORsr of the succeeding document ORs passes the second document detection position 34b. On the other hand, when the size information SI indicates the second size, the controller 11 advances the process to S208, and sets the wait W2 to the second time T2 for the A3 size. In this case, the controller 11 changes the feeding operation from the first speed V1 as a low speed to the second speed V2 as a high speed the second time T2 after the rear end ORsr of the succeeding document ORs passes the second document detection position 34b.

As a result, when reading the A4 size document, the wait W2 is set to the relatively short first time T1 that provides a high throughput suitable for the A4 size, so that the high throughput can be obtained when reading the A4 size document. When reading an A3 size document, the wait W2 is set to the relatively long second time T2 that provides a high throughput suitable for the A3 size, so that the high throughput can be obtained when reading the A3 size document. Therefore, also in this specific example, the throughput can be improved according to the size of the document when reading a document included in the document group.

7. SPECIFIC EXAMPLE 5 OF PROCESSING PERFORMED BY IMAGE READING APPARATUS

As illustrated in FIG. 11, the low-speed feeding operation can be performed without stopping the feeding operation between the documents. The wait management process in this case can be performed according to the flowchart illustrated in FIG. 10. When the size information SI indicates the first size, the controller 11 changes the feeding operation from the first speed V1 as a low speed to the second speed V2 as a high speed the first time T1 after the rear end ORsr of the succeeding document ORs passes the second document detection position 34b. When the size information SI indicates the second size, the controller 11 changes the feeding operation from the first speed V1 as a low speed to the second speed V2 as a high speed the second time T2 after the rear end ORsr of the succeeding document ORs passes the second document detection position 34b.

As a result, when reading the document of the first size, the wait W2 is set to the relatively short first time T1 that provides a high throughput suitable for the first size, so that the high throughput can be obtained when reading the first size document. Also, when reading the document of the second size larger than that of the first size, the wait W2 is set to the relatively long second time T2 that provides a high throughput suitable for the second size, so that high throughput can be obtained when reading the second size document. Therefore, also in this specific example, the throughput can be improved according to the size of the document when reading a document included in the document group.

8. MODIFICATION

Various modifications of the present disclosure are conceivable. For example, the image reading apparatus may be a single surface read-only machine that does not have the back surface image sensor 22 and reads only the front surface of the document OR0. The way of detecting that the leading end of the document OR0 has reached the transport unit 30 is not limited to the detection by the second document detection sensor 47. For example, when the paper feed motor 38 has an encoder, it is possible to detect by a pulse output from the encoder that the leading end of the document OR0 has reached the transport unit 30 after the first document detection sensor 46 detects the leading end. The way of detecting that the rear end of the document OR0 passes the predetermined position may be implemented by the detection by a document detection sensor located closer to the feeding unit 35 than the first document detection position 34a and an encoder of the paper feed motor 38. In the above-described embodiment, different motors are used for the transport unit 30 and the feeding unit 35, but a common motor can be used for the transport unit 30 and the feeding unit 35 when the apparatus has a mechanism that turns ON and OFF the transmission of rotational power. The image reading apparatus 10 may selectively perform any one of at least part of the wait management processes among the wait management processes illustrated in FIGS. 5, 7, 8, and 10.

9. CLOSING

As explained above, according to various embodiments of the present disclosure, it is possible to provide a technique of the image reading apparatus that improves the throughput when reading a document included in a document group according to the size of the document. Of course, the above-described basic functions and effects can be obtained even with the technology including only the constituent components according to the independent claims. In addition, a configuration in which the configurations disclosed in the above-described examples are replaced with each other or the combination is switched, a configuration in which the configurations disclosed in the related art and the above-described examples are replaced with each other or the combination is switched, and other configurations can be implemented. The present disclosure includes these configurations and the like.

What is claimed is:

1. An image reading apparatus comprising:
a reading unit that is configured to successively read a plurality of documents one document at a time, the plurality of documents including at least two documents including a preceding document followed by a succeeding document, the reading unit also configured to generate image data as a result of reading each of the plurality of documents;
a storage unit that is configured to store the image data generated by the reading unit;
a transport unit that is configured to successively transport the plurality of documents one document at a time along a transport path that passes the reading unit;
a feeding unit that is configured to transport each document of the plurality of documents that have been separated from a document group to the transport unit along the transport path;
a controller that is configured to:
after a leading end of the preceding document transported by the feeding unit reaches the transport unit, stop a feeding operation of the feeding unit, the stopping of the feeding operation—thereby stopping movement of the succeeding document towards the transport unit, and
after a rear end of the preceding document passes a predetermined position, restart the feeding operation of the feeding unit, the restarting of the feeding operation restarting movement of the succeeding document towards the transport unit; and
an acquisition unit that is configured to acquire size information indicating a size of the preceding document, wherein
the controller is further configured to:
when the size information indicating the size of the preceding document indicates a first size, restart the feeding operation a first time after a rear end of the succeeding document passes the predetermined position, and
when the size information indicating the size of the preceding document indicates a second size larger than the first size, restart the feeding operation a second time after the rear end of the succeeding document passes the predetermined position, the second time being longer than the first time.

2. The image reading apparatus according to claim 1, wherein
the acquisition unit is configured to acquire, as the size information indicating a size of the previous document, a data amount of the image data of the preceding document stored in the storage unit, and wherein
the controller is configured to
restart the feeding operation the first time after the rear end of the succeeding document passes the predetermined position when the data amount indicates a first data amount as the first size, and
restart the feeding operation the second time after the rear end of the succeeding document passes the predetermined position when the data amount indicates a second data amount as the second size.

3. The image reading apparatus according to claim 1, wherein the acquisition unit includes a document detection unit that is configured to detect a presence or absence of the document at a document detection position at the transport path, and acquires a length of the preceding document along the transport path as the size information based on a detection result by the document detection unit, and wherein the controller is configured to restart the feeding operation the first time after the rear end of the succeeding document passes the predetermined position when the length indicates a first length as the first size, and restart the feeding operation the second time after the rear end of the succeeding document passes the predetermined position when the length indicates a second length as the second size.

4. The image reading apparatus according to claim 1, wherein the acquisition unit includes a document detection unit that is configured to detect a presence or absence of the document at a document detection position at the transport path, obtain a length of the preceding document along the transport path based on a detection result by the document detection unit, obtain a width of the preceding document based on a reading result by the reading unit, and acquire an area of the preceding document as the size information based on the length and the width, and wherein the controller is configured to restart the feeding operation the first time after the rear end of the succeeding document passes the predetermined position when the area indicates a first area as the first size, and restart the feeding operation the second time after the rear end of the succeeding document passes the predetermined position when the area indicates a second area as the second size.

5. An image reading apparatus comprising:

a reading unit that is configured to successively read a plurality of documents one document at a time, the plurality of documents including at least two documents including a preceding document followed by a succeeding document, the reading unit also configured to generate image data as a result of reading each of the plurality of documents;

a storage unit that is configured to store the image data generated by the reading unit;

a transport unit that is configured to successively transport the plurality of documents one document at a time along a transport path that passes the reading unit;

a feeding unit that is configured to transport each document separated from a document group to the transport unit along the transport path;

a controller that is configured to set, at a first speed or less, a feeding operation of the feeding unit after a leading end of a preceding document transported from the feeding unit reaches the transport unit, and sets, at a second speed, the feeding operation after a rear end of the preceding document passes a predetermined position, the second speed being higher than the first speed; and an acquisition unit that is configured to acquire size information indicating a size of the preceding document, wherein the controller is further configured to set, at the second speed, the feeding operation a first time after a rear end of a succeeding document following the preceding document passes the predetermined position when the size information indicates a first size, and set, at the second speed, the feeding operation a second time after the rear end of the succeeding document passes the predetermined position, the second time being longer than the first time, when the size information indicates a second size larger than the first size.

6. A method of controlling an image reading apparatus, the image reading apparatus including a reading unit that generates image data by successively reading a plurality of documents one document at a time, the plurality of documents including at least two documents including a preceding document followed by a succeeding document, the image reading apparatus further including a storage unit that stores the image data read by the reading unit, a transport unit that successively transports the plurality of documents one document at a time along a transport path that passes the reading unit, and a feeding unit that transports each document of the plurality of documents that have been separated from a document group to the transport unit along the transport path, the method comprising:

a first step of stopping a feeding operation of the feeding unit after a leading end of a preceding document transported from the feeding unit reaches the transport unit, the stopping of the feeding operation thereby stopping movement of the succeeding document towards the transport unit, and restarting the feeding operation after a rear end of the preceding document passes a predetermined position, the restarting of the feeding operation thereby moving the succeeding document towards the transport unit; and a second step of acquiring size information indicating a size of the preceding document, wherein the first step includes restarting the feeding operation a first time after a rear end of a succeeding document following the preceding document passes the predetermined position when the size information indicates a first size, and restarting the feeding operation a second time after the rear end of the succeeding document passes the predetermined position, the second time being longer than the first time, when the size information indicates a second size larger than the first size.

* * * * *